March 17, 1953 F. N. MARIANI 2,631,591
TOBACCO SMOKING PIPE
Filed Aug. 18, 1948 2 SHEETS—SHEET 2
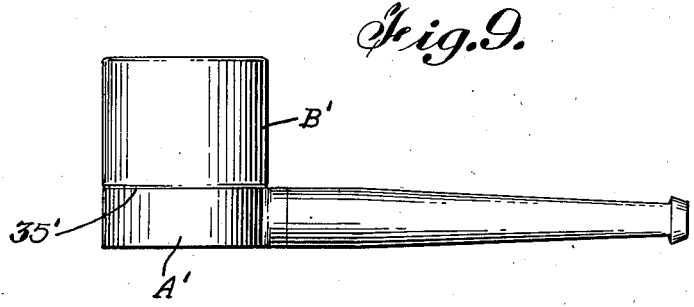
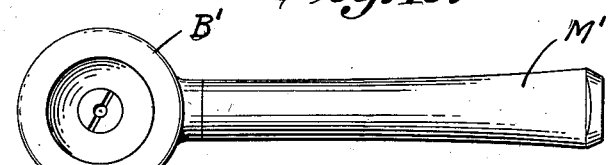
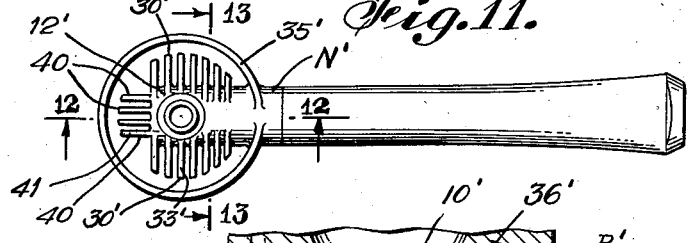
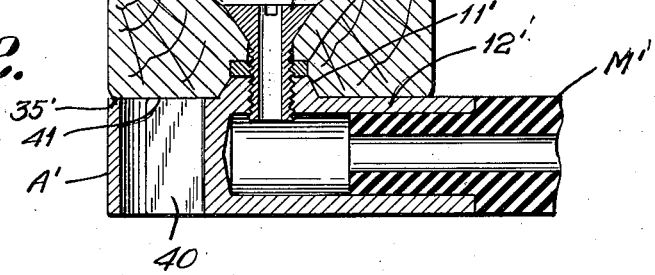
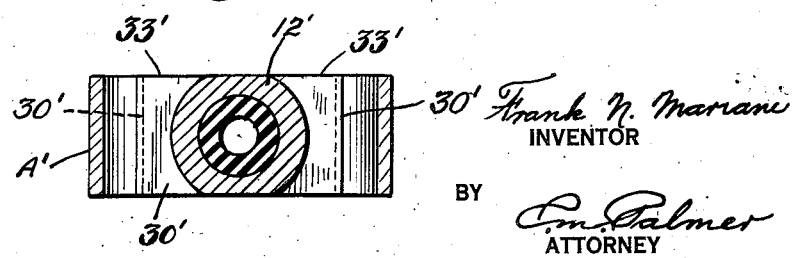
Frank N. Mariani
INVENTOR
BY C. M. Palmer
ATTORNEY Patented Mar. 17, 1953

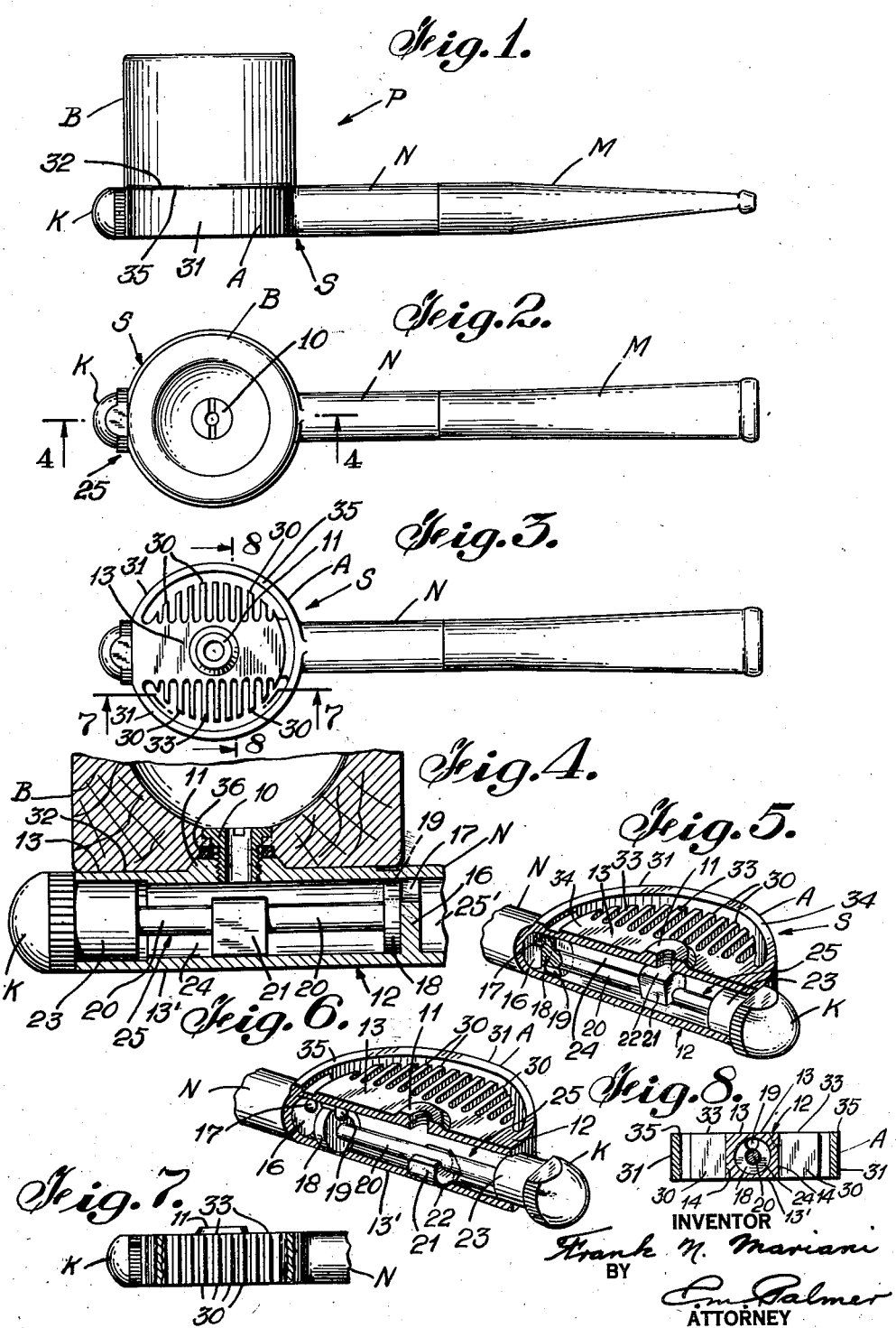

2,631,591

UNITED STATES PATENT OFFICE 2,631,591

TOBACCO SMOKING PIPE

Frank N. Mariani, Washington Heights, New York, N. Y.

Application August 18, 1948, Serial No. 44,819

10 Claims. (Cl. 131—194)

The present invention is a functionally and structurally improved smoking pipe wherein the bowl is seated on a novel grid for conducting and dissipating the heat originating in the bowl. The primary object of the invention has to do with a smoke conducting tube having a plurality of heat radiating or dissipating fins or ribs spaced from and desirably encompassed by arcuate means cooperating in association with the fins to provide a seat for and to sustain the bowl. Another object is realized in having the bowl supporting surfaces of the fins and arcuate means arranged in the same plane. Another object deals with arranging the fins integral with but laterally of the tube. A further object is to provide the tube with a closed end having spaced fins overhanging the distal end thereof. A further object comprehends the provision of a grid having spaced and flat bowl supporting surfaces for advantageously conducting heat transmitted from the bowl away from the latter. Other specific objects, advantages and features of the invention will be apparent from the following detailed specification taken in the light of the accompanying drawings wherein:

Fig. 1 is a side elevation of the pipe according to one embodiment of my invention.

Fig. 2 is a plan view of Fig. 1.

Fig. 3 is a view similar to Fig. 2 but with the bowl removed to illustrate the grid.

Fig. 4 is an enlarged vertical and longitudinal sectional view on the line 4—4 of Fig. 2.

Fig. 5 is a fragmentary perspective view illustrating the regulatory valve closed.

Fig. 6 is a view along the lines of Fig. 5 showing the valve in an opened relation and partly withdrawn.

Fig. 7 is a vertical sectional view on the line 7—7 of Fig. 3.

Fig. 8 is a transverse sectional view on the line 8—8 of Fig. 3.

Fig. 9 is a side elevational view of another embodiment according to my invention.

Fig. 10 is a plan view of Fig. 9.

Fig. 11 is a view similar to Fig. 10 but with the bowl removed.

Fig. 12 is an enlarged sectional view on the line 12—12 of Fig. 11, and

Fig. 13 is a transverse sectional view on the line 13—13 of Fig. 11.

According to the form illustrated in Figs. 1–8, the tobacco smoking pipe is generally denoted P and is characterized by the detachable wooden bowl B, the metal bowl support S, and the mouth piece M.

Fixedly anchored in the bottom wall of the bowl is the hollow bushing 10 having its lower externally threaded portion removably interconnected with the internally threaded tapered boss 11 projecting upwardly from the top wall of the cylindrically bored tube 12 which as shown is externally substantially square shaped having the spaced upper and lower walls 13 and 13′ and straight vertical sides 14.

Surrounding tube 12 and integral with the ends thereof is the annular metal band A from which the metal cylindrical and hollow shank or nipple N projects and this shank is integral with the band A.

Merged with both tube 12 and nipple N is the internal baffle 16 provided with opening 17 adapted to be opened or closed by disc 18 provided with orifice 19 and carried by the valve stem 20 to which is also fixedly secured valve closure member 21 having the arcuate face 22 serving when required to seal off, that is, close the bore of the internally threaded boss 11 (Fig. 5).

Also fixedly carried by the valve stem 20 is the knob K having the cylindrical reduced portion 23 closely but removably fitting into the cylindrical bore 24 of tube 12 for effectively closing the latter. Knob K cooperates with the front end of the bowl support S and limits insertion of the regulatory valve generally designated 25 constituted by the valve stem 20 and spaced valve members 18 and 21 and when the valve 25 is fully inserted, disc or valve member 18 is against baffle 16 and valve member 21 is directly underneath the bushing 10. If the knob K be in the position illustrated in Fig. 4 apertures 17 and 19 are in alignment and valve member 21 is clear of bushing 10. Hence smoke from the bowl may be drawn downwardly into tube 12 and through the cylindrical bore 24 thereof through the alined orifices 17 and 19 into the cylindrical bore 25′ (Fig. 4) of the nipple N and thereafter into the mouthpiece M.

In the event it is desired to shut off communication between the bowl B and the bowl support S and the latter from the mouth piece, the valve 25 is merely rotated one hundred and eighty degrees from its fully opened position (Fig. 4). By such action disc 18 shuts off aperture 17 and the arcuate face 22 of valve member 21 closes or shuts off the internally threaded bore of boss 11, hence prevening smoke from being drawn into tube 12 and into the shank of nipple N (Fig. 5).

Extending laterally of the vertical side walls 14 of tube 12 and integral therewith are a plurality of spaced fins or ribs 30 disposed in parallel and progressively decreasing in length in proportion to their distances away from the vertical transverse plane taken across the origin of boss 11. Fins 30 are surrounded by arcuate arms 31 of the rim or annular member A which together with tube 12 and fins 30 may be broadly considered a flat seat on which the flat bottom face 32 of the bowl B is supported. It will be observed that the upper faces 33 of the fins 30 are in the same plane as the upper flat face or wall 13 of the tube 12 and the upper flat faces 35 of the arcuate arms 31 are coplanar therewith. If desired a suitable gasket 36 may be secured to the bowl to removably engage boss 11 when the bowl is fully seated on the rim A and a grid which is characterized in part by tube 12 and fins 30. If therefore the bowl be screwed tightly on the grid, the bowl contacts the tube 12, the fins 30 and the arcuate arms 31 of the bowl support S, and consequently cooling of the smoke takes place in that the fins 30, the arcuate arms 31 and even the walls of tube 12 serve as heat distributing and dissipating elements, conducting the heat away from the bowl, thereby providing means to cool the smoke drawn into the grid constituted in part by tube 12 and fins 30. As is well appreciated, valve 25 may also be slightly turned to control the volume of smoke entering the tube and even may be slidably withdrawn therefrom when desired for cleaning the interior of the tube.

In the form illustrated in Figs. 9 to 13 inclusive, no valve is provided and the front end of the metal grid is free and spaced from the front part of the annular metal rim A' and embodies the spaced heat dissipating fins or ribs 40 substantially normal to the spaced fins 30', the ribs 40 projecting from the front or distal but closed end of tube 12' which unlike tube 12 of Figs. 1–8, is externally cylindrical in part. The fins 30' project from the curved sides of the tube 12' as seen in Figs. 11 and 13. The top faces 33' and 41 of the fins 30' and 40 are coplanar and are also in the same plane as the top flat annular face 35' of the ring or annulus A', thus providing a flat seat on which the flat bottomed bowl B' is removably supported. As in the case of the form shown in Figs. 1–8, a suitable gasket 36' may be utilized in the embodiment according to Figs. 9–13 for effectively seating on the upstanding boss 11'; and the bushing 10', like bushing 10 of Fig. 4, may be considered as means detachable from the grid for connecting the bowl thereto. In other aspects the embodiment according to Figs. 9–13 is along the lines disclosed in connection with the form shown in Figs. 1–8 and corresponding parts have similar but primed reference characters.

Various changes may be made in details of construction and arrangement of parts without departing from the spirit of the invention or sacrificing any of the advantages thereof inherent therein.

I claim:

1. In a pipe having a bowl; a rim, a smoke conducting tube within and integral with said rim and having means adapted to be arranged in communication with said bowl, a plurality of closely spaced heat dissipating fins extending towards said rim and integral with and projecting from spaced sides of said tube and having upper surfaces for engaging the bottom wall of said bowl, and a connection for detachably holding said bowl on said surfaces and rim.

2. In a pipe having a bowl; an annular rim, a smoke conducting tube within and integral with said rim and having means adapted to be arranged in communication with said bowl, a plurality of closely spaced heat dissipating fins spaced from said rim and integral with and projecting from spaced sides of said tube and having upper surfaces for engaging the bottom wall of said bowl, and a connection for detachably holding said bowl on said surfaces and rim.

3. In a pipe having a bowl; an annular rim, a smoke conducting tube disposed diametrically along the diameter of said rim and integral with said rim and having means adapted to be arranged in communication with said bowl, a plurality of closely spaced heat dissipating fins spaced from said rim and integral with and projecting from spaced sides of said tube and having upper surfaces for engaging the bottom wall of said bowl, a tubular shank outside of and integral with said rim and in communication with said tube, and a connection for detachably holding said bowl on said surfaces and rim.

4. In a pipe having a bowl; an annular rim, a smoke conducting tube within said rim and having at least one end integral therewith and having means adapted to be arranged in communication with said bowl, a plurality of closely spaced heat dissipating fins spaced from said rim and integral with and projecting from spaced sides of said tube and having upper surfaces for engaging the bottom wall of said bowl, a tubular shank outside of and integral with said rim and in communication with said tube, and a connection for detachably holding said bowl on said surfaces and rim.

5. In a pipe having a bowl; an annular rim, a smoke conducting tube disposed along the diameter of said rim and integral therewith and having means adapted to be arranged in communication with said bowl, a plurality of closely spaced heat dissipating fins spaced from said rim and integral with and projecting from spaced sides of said tube and having upper surfaces for engaging the bottom wall of said bowl, a tubular shank outside of and integral with said rim and in communication with said tube; said rim, tube and fins having upper flat surfaces disposed in the same plane, and a connection for detachably holding said bowl on said surfaces.

6. In a pipe having a bowl; an annular rim, a smoke conducting tube within said rim and having one end only integral therewith and a distal end spaced therefrom, a plurality of closely spaced heat dissipating ribs projecting from said distal end, a plurality of closely spaced heat dissipating fins spaced from said rim and integral with and projecting from spaced sides of said tube and having upper surfaces for engaging the bottom wall of said bowl, a tubular shank outside of and integral with said rim and in communication with said tube, a hollow boss projecting upwardly from said tube and in communication with said bowl, and a connection for detachably holding said bowl on said surfaces, rim and ribs.

7. In a pipe having a bowl; an annular rim, a smoke conducting tube within said rim and having one end only integral therewith and a distal end spaced therefrom, a plurality of closely spaced ribs projecting from said distal end, a plurality of closely spaced heat dissipating fins substantially normal to said ribs and spaced from said rim and integral with and projecting from spaced sides of said tube and having upper surfaces for engaging the bottom wall of said bowl, a tubular shank outside of and integral with said rim and in communication with said tube, a hollow boss projecting upwardly from said tube and in communication with said bowl, and a connection for detachably holding said bowl on said surfaces, rim and ribs.

8. In a pipe having a bowl; an annular rim, a smoke conducting tube within said rim and having one end only integral therewith and a distal end spaced therefrom, a plurality of closely spaced ribs spaced from said rim and projecting from said distal end and including upper flat faces, a plurality of closely spaced heat dissipating fins spaced from said rim and integral with and projecting from spaced sides of said tube and having upper flat surfaces for engaging the bottom wall of said bowl, a tubular shank outside of and integral with said rim and in communication with said tube, a hollow boss projecting upwardly from said tube and in communication with said bowl, and a connection for detachably holding said bowl on said surfaces, faces and rim.

9. As a new article of manufacture; an annular rim, a smoke conducting tube disposed along the diameter of said rim and integral with the latter, a plurality of closely spaced heat dissipating fins within and spaced from said rim and integral with and projecting from spaced sides of said tube, and a tubular shank outside of and integral with said rim and in communication with said tube, the upper surfaces of said tube, rim and fins being all disposed substantially in the same horizontal plane.

10. As a new article of manufacture; an annular rim, a smoke conducting tube disposed along the diameter of said rim and integral with the latter, a plurality of closely spaced heat dissipating fins within and spaced from said rim and integral with and projecting from spaced sides of said tube but substantially normal to the latter, a tubular shank outside of and integral with said rim and in communication with said tube, the upper surfaces of said tube, rim and fins being all disposed substantially in the same horizontal plane, said fins progressively decreasing in length in proportion to their respective distances away from the center of said rim, and a hollow boss extending upwardly from said tube.

FRANK N. MARIANI.

REFERENCES CITED

The following references are of record in the file of this patent:

UNITED STATES PATENTS

| Number | Name | Date |
|---|---|---|
| D. 145,113 | Bercu | July 2, 1946 |
| 1,767,997 | Nicholls | June 24, 1930 |
| 1,871,365 | Griswold | Aug. 9, 1932 |
| 1,881,793 | Mariani | Oct. 11, 1932 |
| 2,200,237 | Kirsten | May 7, 1940 |
| 2,250,643 | Mariani | July 29, 1941 |
| 2,325,412 | Martin | July 27, 1943 |

FOREIGN PATENTS

| Number | Country | Date |
|---|---|---|
| 24,117 | Germany | Sept. 15, 1883 |
| 142,682 | Great Britain | May 13, 1920 |